D. BUTLER.
APPARATUS FOR TESTING MOTOR VEHICLES.
APPLICATION FILED APR. 8, 1920.
1,407,377. Patented Feb. 21, 1922.
2 SHEETS—SHEET 1.
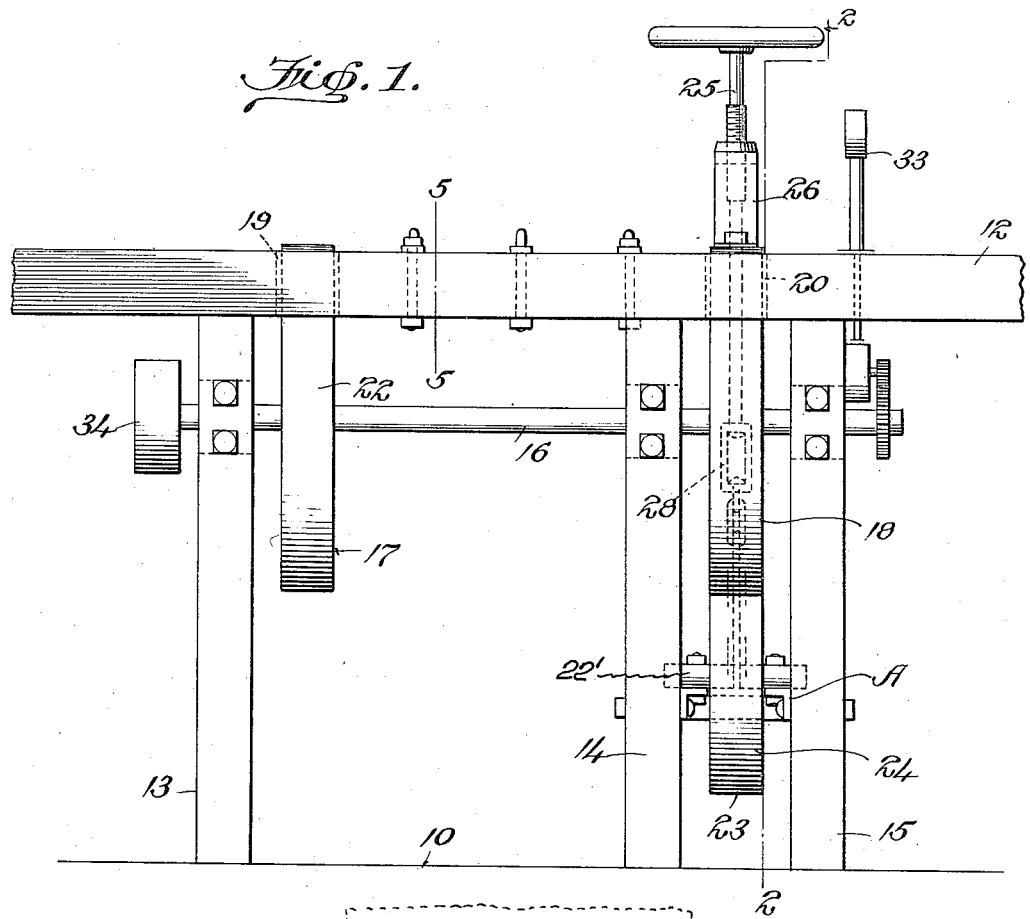
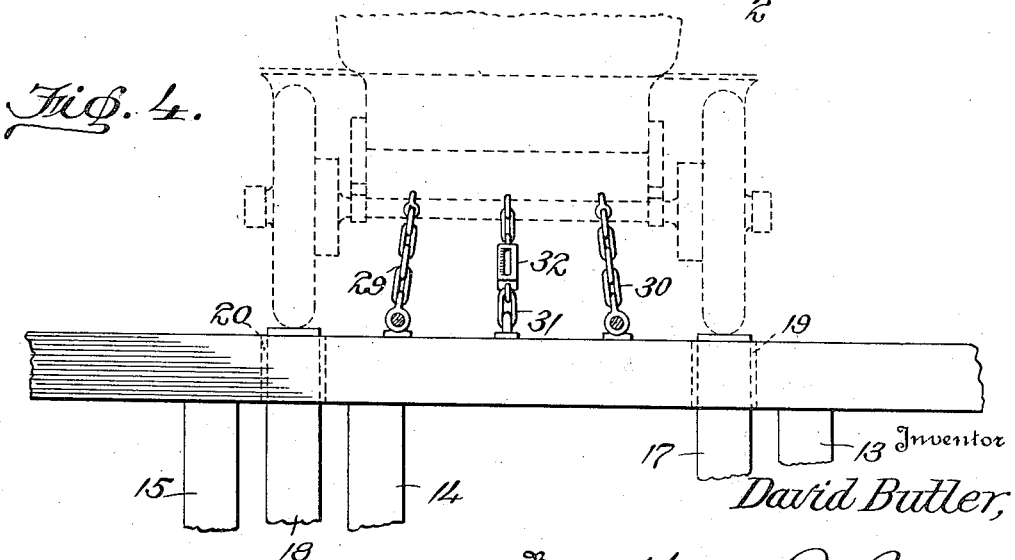
Inventor
David Butler,
By Henry P. Bright
Attorney D. BUTLER.
APPARATUS FOR TESTING MOTOR VEHICLES.
APPLICATION FILED APR. 8, 1920.
1,407,377.
Patented Feb. 21, 1922.
2 SHEETS—SHEET 2.
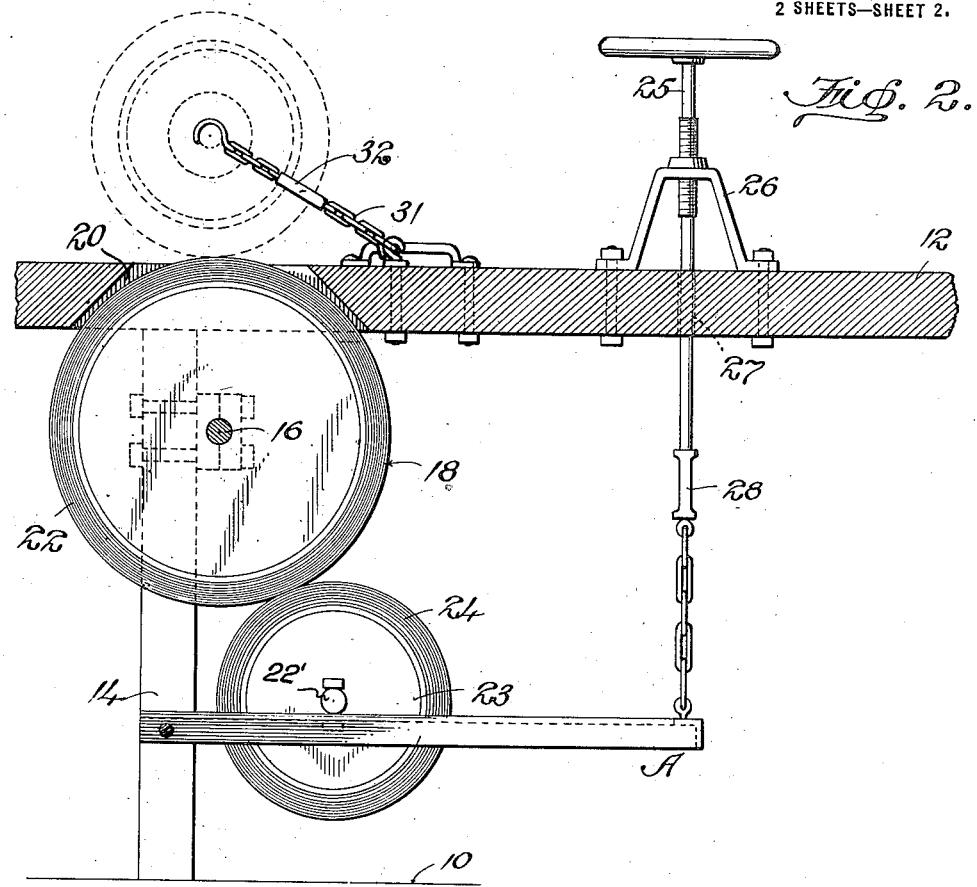
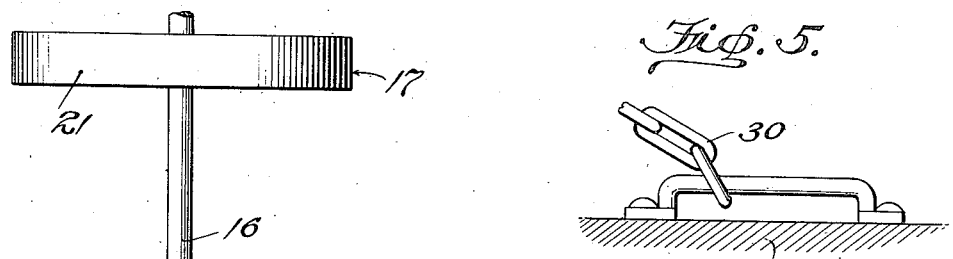
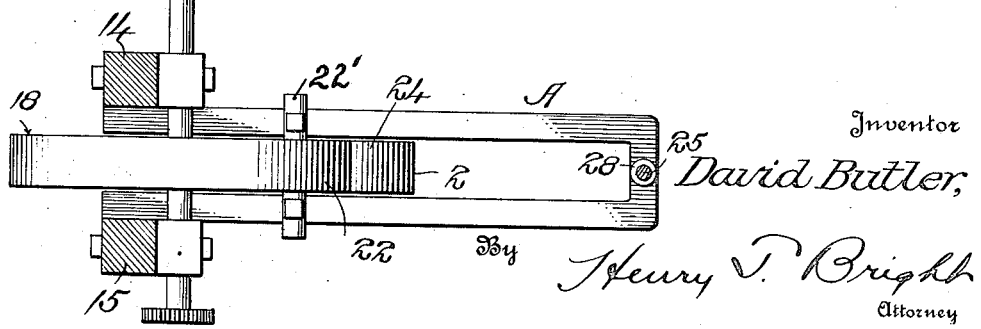
Inventor
David Butler,
By Henry T. Bright
Attorney

UNITED STATES PATENT OFFICE.

DAVID BUTLER, OF MONTEZUMA, NEW YORK.

APPARATUS FOR TESTING MOTOR VEHICLES.

1,407,377. Specification of Letters Patent. Patented Feb. 21, 1922.

Application filed April 8, 1920. Serial No. 372,153.

*To all whom it may concern:*

Be it known that I, DAVID BUTLER, a citizen of the United States, residing at Montezuma, in the county of Cayuga and State of New York, have invented certain new and useful Improvements in Apparatus for Testing Motor Vehicles, set forth in the annexed specification.

My invention relates to apparatus for testing motor vehicles.

It is the purpose of my invention to provide an improved construction of apparatus of the type named which will enable the draft or pull, speed, and imperfections of the motor to be determined without subjecting the motor vehicle to bodily travel.

It is my further purpose to provide an apparatus of the type named which can be easily controlled and which will eliminate the use of brakes with resultant wear of parts.

With the foregoing and other purposes in view my invention consists in the details of construction and in the arrangement and combination of parts to be hereinafter more fully disclosed and particularly pointed out in the claims.

In describing my invention in detail reference will be had to the accompanying drawing wherein like characters of reference denote corresponding parts in the several views, and in which—

Fig. 1 is an end view of my improved apparatus;

Fig. 2, a section on the line 2—2 of Fig. 1;

Fig. 3, a plan view with the fragment of a motor vehicle shown in dotted lines;

Fig. 4, a view similar to Fig. 1 showing the manner of anchoring a motor vehicle to the supporting platform of the apparatus for testing; and Fig. 5, a section on the line 5—5 of Fig. 1 showing in detail an anchoring connection.

Referring to the drawings my improved motor vehicle testing apparatus is shown as comprising a foundation floor 10 from which rises a plurality of uprights which support at a desired elevation a platform or floor 12. In this instance I have only shown three of such uprights at 13, 14 and 15, but it will be understood that as many uprights as desired may be employed to perform the function of supporting the platform 12, and as the uprights 13, 14 and 15 are the only ones directly related to the construction of my apparatus the illustration of this limited number is deemed sufficient. Rotatably mounted on the uprights 13, 14 and 15 is a horizontal shaft 16 upon which is fixed disks 17 and 18 which project respectively through openings 19 and 20 in the platform 12 so as to be in position to be peripherally engaged by the drive wheels of a motor vehicle. These disks 17 and 18 are provided with rubber tires 21 and 22 and the disk 18 is located between the uprights 14 and 15, which latter are disposed relatively near together. Mounted between the uprights 14 and 15 beneath the disk 18 for pivotal movement in a vertical plane is a frame A which has fixed thereto a cylindrical axle 22′ and rotatable on this axle is a pressure wheel 23 provided with a rubber tire 24 and disposed in the same plane as the disk 18 whereby upward pivotal movement of the frame A will force the pressure wheel 23 into peripheral engagement with the disk 18. In order to impart upward pivotal movement to the frame A to force the wheel 23 against the disk 18 and thereby impose a desired load on the disks 17 and 18 and shaft 16 I utilize a hand screw 25 threaded in a bracket 26 mounted on the platform 12 and extending through an opening 27 in said platform. The lower end of the hand screw 25 is swiveled to the upper terminal link of a chain 28, while the lower end of this chain is connected to the free end of a frame A. By this construction it will be apparent that upon rotation of the hand screw 25 in a direction to impart upward movement thereto the frame A will be swung upwardly and the wheel 23 forced into engagement with the disk 18 with constantly increasing pressure and with a resultant increasing braking action at the journal of the wheels 18 and 24. The amount of pressure exerted upon the disk 18 by the wheel 23 will of course be determined by the particular work in hand.

It will be observed that providing the wheels 23 and 16 with rubber tires the braking action produced at the journals is of a yieldable type which has proven of a distinct advantage in the construction of a machine of this type.

To anchor the motor vehicle being tested to the platform 12 so that its drive wheels will be in peripheral engagement with the disks 17 and 18 I mount on the platform 12 spaced guide rails 12' to which are secured respectively in a slidable manner corresponding ends of anchor chains 29 and 30, the other corresponding ends of these chains being adapted for connection to a suitable part of the motor vehicle frame. To determine the draft or pull of a motor vehicle I provide a flexible anchor chain 31 which is somewhat shorter than the anchor chains 29 and 30 and has included therein a spring draft measuring indicator 32. One end of this chain 31 is anchored to the platform 12 and its other end secured in a suitable manner to the motor vehicle frame. The normal length of the chain 31 is such that when the indicating device 32 has been operated to a predetermined extent by the pull or draft of the motor vehicle operating through its drive wheels against the disks 17 and 18 then the anchor chains 29 and 30 become effective in that they have moved to the limit of their position on the guide rails 12'. Prior to reaching the limit of the movement on the guide rails 12' the anchor chains 29 and 30 have a sliding connection with said rails.

In order to determine the speed of a motor vehicle through the operative engagement between its drive wheels and the disks 17 and 18 I operatively connect the shaft 16 with a speed indicating device 33. It will of course be understood that this speed can be determined without any load being exerted on the disks 17 and 18 or with a desired load exerted upon said disk. It will also be apparent that my apparatus can be readily converted into a power plant with the motor of the vehicle as the source of power. This is accomplished by simply anchoring the motor vehicle to the platform 12 with its drive wheels engaging the disks 17 and 18 and providing the shaft with a pulley 34 which can be easily belted to any machine that it is desired to operate.

While I have described one particular form of carrying my invention into practice it will be apparent that the same is susceptible to changes in forms and proportions and to desirable additions with the exercise of only ordinary mechanical skill and without departing from the scope of the appended claims.

What I claim is:

1. In a motor vehicle testing apparatus, the combination of a support, a shaft rotatably mounted on said support, a pair of members fixed on said shaft with which the drive wheels of a motor vehicle are adapted to be peripherally engaged, a frame pivoted to the support for movement in the plane of one of the members on the shaft, a pressure wheel rotatably mounted on the frame and adapted to be forced into peripheral engagement with one of the members on the shaft by pivotal movement of said frame, and means for pivoting said frame to force the pressure wheel into peripheral engagement with the related member on the shaft.

2. In a motor vehicle testing apparatus, the combination of a support, a shaft rotatably mounted on said support, a pair of members fixed on said shaft with which the drive wheels of a motor vehicle are adapted to be peripherally engaged, a frame pivoted to the support for movement in the plane of one of the members on the shaft, a pressure wheel rotatably mounted on the frame and adapted to be forced into peripheral engagement with one of the members on the shaft by pivotal movement of said frame, and screw means for pivoting said frame to force the pressure wheel into peripheral engagement with the related member on the shaft.

3. In a motor vehicle testing apparatus, the combination of a support, a shaft rotatably mounted on said support, a pair of members fixed on said shaft with which the drive wheels of a motor vehicle are adapted to be peripherally engaged, a frame pivoted to the support for movement in the plane of one of the members on the shaft, a pressure wheel rotatably mounted on the frame and adapted to be forced into peripheral engagement with one of the members on the shaft by pivotal movement of said frame, a hand screw operatively mounted on the support, and a flexible connection between the hand screw and the pivoted frame whereby rotation of the hand screw in one direction will force the pressure wheel into peripheral engagement with the related member on the shaft.

4. In a motor vehicle testing apparatus, the combination of a support, a pair of rotatable members thereon with which the drive wheels of a motor vehicle are adapted to be peripherally engaged, means for varying the load opposing the rotation of said members, a flexible anchoring element having one end secured to the support and its other end adapted to be secured to a motor vehicle while the drive wheels of the latter are peripherally engaged with said rotatable members, a measuring device for indicating the draft of a vehicle included in said anchoring element, a pair of guide rods secured to the support, and additional anchoring elements having corresponding ends slidably engaged with said guide rods respectively and their other ends adapted to be secured to a motor vehicle, the movement of the last named anchoring elements on said guide rods being limited when said measuring device has been operated to a predetermined extent.

In testimony whereof I hereunto affix my signature in the presence of two witnesses.

DAVID BUTLER.

Witnesses:
 THOMAS F. NOLAN,
 DANIEL FARRELL.